(12) United States Patent
Russell et al.

(10) Patent No.: US 7,911,497 B2
(45) Date of Patent: Mar. 22, 2011

(54) METHOD AND APPARATUS FOR VIDEO ON DEMAND

(75) Inventors: Richard A. Russell, Windermere, FL (US); Michael S. O'Meara, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1387 days.

(21) Appl. No.: 10/830,222

(22) Filed: Apr. 23, 2004

(65) Prior Publication Data

US 2005/0021202 A1 Jan. 27, 2005

Related U.S. Application Data

(60) Provisional application No. 60/465,227, filed on Apr. 25, 2003.

(51) Int. Cl.
*H04N 7/18* (2006.01)
(52) U.S. Cl. .................................. 348/143; 348/142
(58) Field of Classification Search .......... 348/113–118, 348/142–160, 211–213
See application file for complete search history.

(56) References Cited

U.S. PATENT DOCUMENTS

| | | | |
|---|---|---|---|
| 4,782,346 A * | 11/1988 | Sharma | 343/795 |
| 5,508,736 A | 4/1996 | Cooper | |
| 6,056,237 A | 5/2000 | Woodland | |
| 6,130,705 A | 10/2000 | Lareau et al. | |
| 6,195,122 B1 | 2/2001 | Vincent | |
| 6,288,686 B1 * | 9/2001 | Josypenko | 343/895 |
| 6,377,875 B1 | 4/2002 | Schwaerzler | |
| 6,664,976 B2 * | 12/2003 | Lofgren et al. | 345/634 |
| 7,027,612 B2 * | 4/2006 | Patterson et al. | 382/100 |
| 7,091,851 B2 * | 8/2006 | Mason et al. | 340/539.13 |
| 7,093,191 B1 * | 8/2006 | Jain et al. | 715/201 |
| 7,096,428 B2 * | 8/2006 | Foote et al. | 715/721 |
| 7,099,492 B2 * | 8/2006 | Rhoads | 382/100 |
| 2003/0008611 A1 | 1/2003 | Forman et al. | |
| 2003/0066932 A1 | 4/2003 | Carroll | |

FOREIGN PATENT DOCUMENTS

| | | |
|---|---|---|
| EP | 0 959 418 | 11/1999 |
| JP | 2000163671 | 6/2000 |
| WO | WO 98/05017 | 2/1998 |

OTHER PUBLICATIONS

Communication and Supplementary European Search Report dated Apr. 24, 2008.
Office Action dated Feb. 12, 2010, issued in corresponding Japanese Application No. 2006-532467, 4 pps.

* cited by examiner

*Primary Examiner* — Andy S Rao
(74) *Attorney, Agent, or Firm* — Buchanan Ingersoll & Rooney PC (57) ABSTRACT

An exemplary method for processing and outputting video frames includes receiving a stream of video frames, inserting geo-location data into a video frame to generate a modified video frame, and outputting the modified video frame. An exemplary system includes an antenna which receives a stream of video frames, a processor which inserts geo-location data into a video frame to generate a modified video frame, and an output for outputting the modified video frame.

31 Claims, 9 Drawing Sheets

METHOD AND APPARATUS FOR VIDEO ON DEMAND

This non-provisional application claims priority from U.S. Provisional Application No. 60/465,227 filed in the U.S. Patent and Trademark Office on 25 Apr. 2003. U.S. Provisional Application No. 60/465,227 is incorporated herein by reference.

BACKGROUND

U.S. Pat. No. 6,377,875 discloses a method of controlling a remotely controlled unmanned air vehicle (UAV). Upon loss of radio contact between a control station (6) and the UAV (1), the UAV (1) flies on a preprogrammed safety route (3). As required the UAV is guided to a flight path (2) that is remote-controlled from the control station (6), and, in the event of an interruption of the radio contact, the UAV flies on a substitute route calculated with on-board equipment, without active intervention from the remote control station.

U.S. Pat. No. 6,130,705 discloses an aerial reconnaissance system that generates imagery of a scene that meets resolution or field of view objectives automatically and autonomously. In one embodiment, a passive method of automatically calculating range to the target from a sequence of airborne reconnaissance camera images is used. Range information is use for controlling the adjustment of a zoom lens to yield frame-to-frame target imagery that has a desired, e.g., constant, ground resolution or field of view at the center of the image despite rapid and significant aircraft altitude and attitude changes. Image to image digital correlation is used to determine the displacement of the target at the focal plane. Camera frame rate and aircraft INS/GPS information is used to accurately determine the frame to frame distance (baseline). The calculated range to target is then used to drive a zoom lens servo mechanism to the proper focal length to yield the desired resolution or field of view for the next image. The method may be performed based on parameters other than range, such as aircraft height and stand off distance.

U.S. Pat. No. 6,056,237 discloses a sonotube-compatible unmanned aerial vehicle (UAV), and systems for launch and control of the UAV. The UAV is generally comprised of modular sections including a nose section, a payload section, a wing and fuel tank section, and a powerplant section. The modular sections are attached to adjacent sections by uniform lock sealing rings and related components. The present invention comprises an apparatus enabling very small, man portable, ballistically launched, autonomously or semi-autonomously controlled vehicle to be deployed with preprogrammed, communicated, or telemetry mission programming. A wide range of payload packages, including emergency supplies, sensors, and antenna assemblies, may be carried, used or deployed in flight. The UAV can be equipped to transmit video, data and audio signals. Man-portable operation is accomplished by the use of a launch canister apparatus. The launch canister comprises retractable launch stabilizing legs, turbine engine exhaust orifices, and various antennas. The launch canister apparatus alternatively comprises a modified type "A", "B", or "C" sonotube launch canister. The system of the invention also comprises a portable Command, Control, Communications, Computer, and Intelligence (C4I) control and sensing analysis console. The console is preferably ruggedized, waterproof, shockproof, and includes control and analysis computers, input/output devices, antennas, and related hardware and software for vehicle and mission control. A C4I console and/or launch canisters may be transported by means of a backpack adapted for man portability. The UAV can include optical or nonoptical sensors. The sensors may be a "Low Cost Uncooled Sensor Prototype" (LOCUSP) thermal vision system, or the Lockheed-Martin "MICRO-FLIR" manufactured by Fairchild Systems, USA, or other existing micro FLIR (Forward Looking InfraRed) systems typical of those manufactured by Raytheon or Hughes Electro Optics, USA. Other optical sensors adaptable as sensors 13 include daylight video, fourth generation Low Light Television (LLTV), all light television (ALLTV) night vision systems typical of those developed by ITT Electronics USA. The sensors may also include laser ranging and targeting systems of conventional design adapted from the Lockheed-Martin AN/AAQ-13/14 LANTIRN Sharpshooter type systems, or other long range laser ranging systems.

SUMMARY

An exemplary method for processing and outputting video frames includes receiving a stream of video frames, inserting geo-location data into a video frame to generate a modified video frame, and outputting the modified video frame.

An exemplary system includes an antenna which receives a stream of video frames, a processor which inserts geo-location data into a video frame to generate a modified video frame, and an output for outputting the modified video frame.

An exemplary system includes a first aircraft including at least one sensor, a second aircraft including at least one sensor, a communication station, and a data link having a node at each of the first aircraft, the second aircraft and the communication station, wherein the datalink conveys data from the first aircraft, to the node on the second aircraft, the data link includes data storage arranged to store data generated by the at least one of the first and second aircraft and the data storage is located on the second aircraft, the data link includes a search engine on the second aircraft arranged to process and transmit data stored in the data storage based on instructions received from the communication station, and the data comprises imagery, geo-location data associated with the imagery, and time tags associated with the imagery.

An exemplary method provides full motion video from a sensing platform of what a remote user wants to see in time and space, upon demand from the remote user. From a remote location the user can call up video from or relating to a given time and space, and using a search engine determine what video and data products are available to the remote user. This exemplary method can include receiving a stream of video frames, inserting geo-location data into a video frame to generate a modified video frame, and outputting the modified video frame. An exemplary system includes an antenna, which receives a stream of video frames, a processor that inserts geo-location data into a video frame to generate a modified video frame, and an output for outputting the modified video frame.

DETAILED DESCRIPTION

Figure 7:
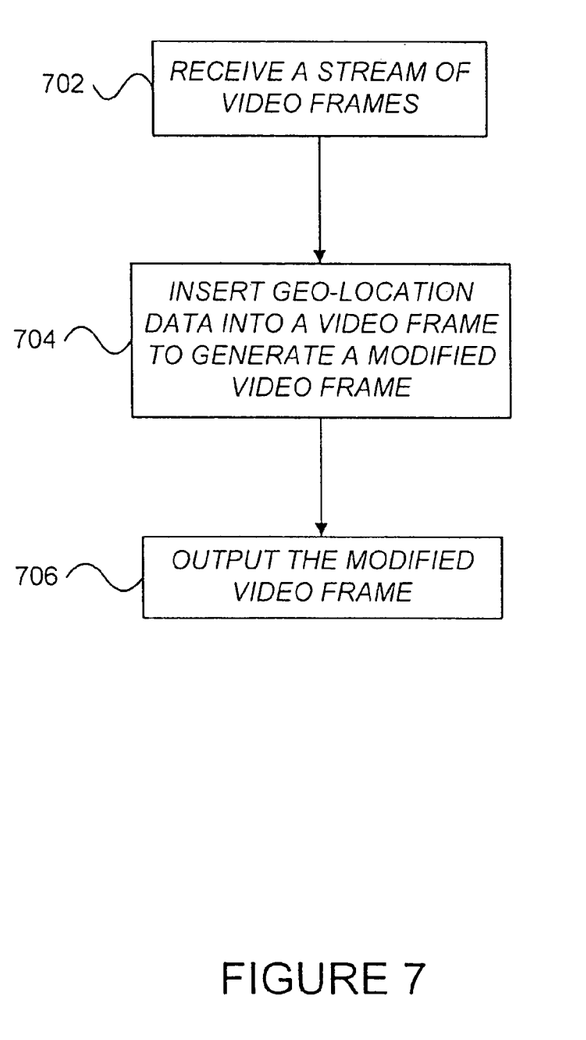
FIG. 7 is a flow diagram in accordance with an exemplary method.

Exemplary embodiments are directed to video on demand, and more specifically to tactical video on demand. FIG. 7 shows an exemplary method for processing and outputting video frames, including receiving a stream of video frames in a first block 702, inserting geo-location data into a video frame to generate a modified video frame in a next block 704, and then outputting the modified video frame in block 706. The insertion in block 704 can for example be performed by the TCDL electronics 220, 605, 533. The process shown in FIG. 7 can be repeated, for example by repeating blocks 704 and 706 with respect to a single stream of video frames, and/or with respect to multiple streams of video frames.

Figure 8:
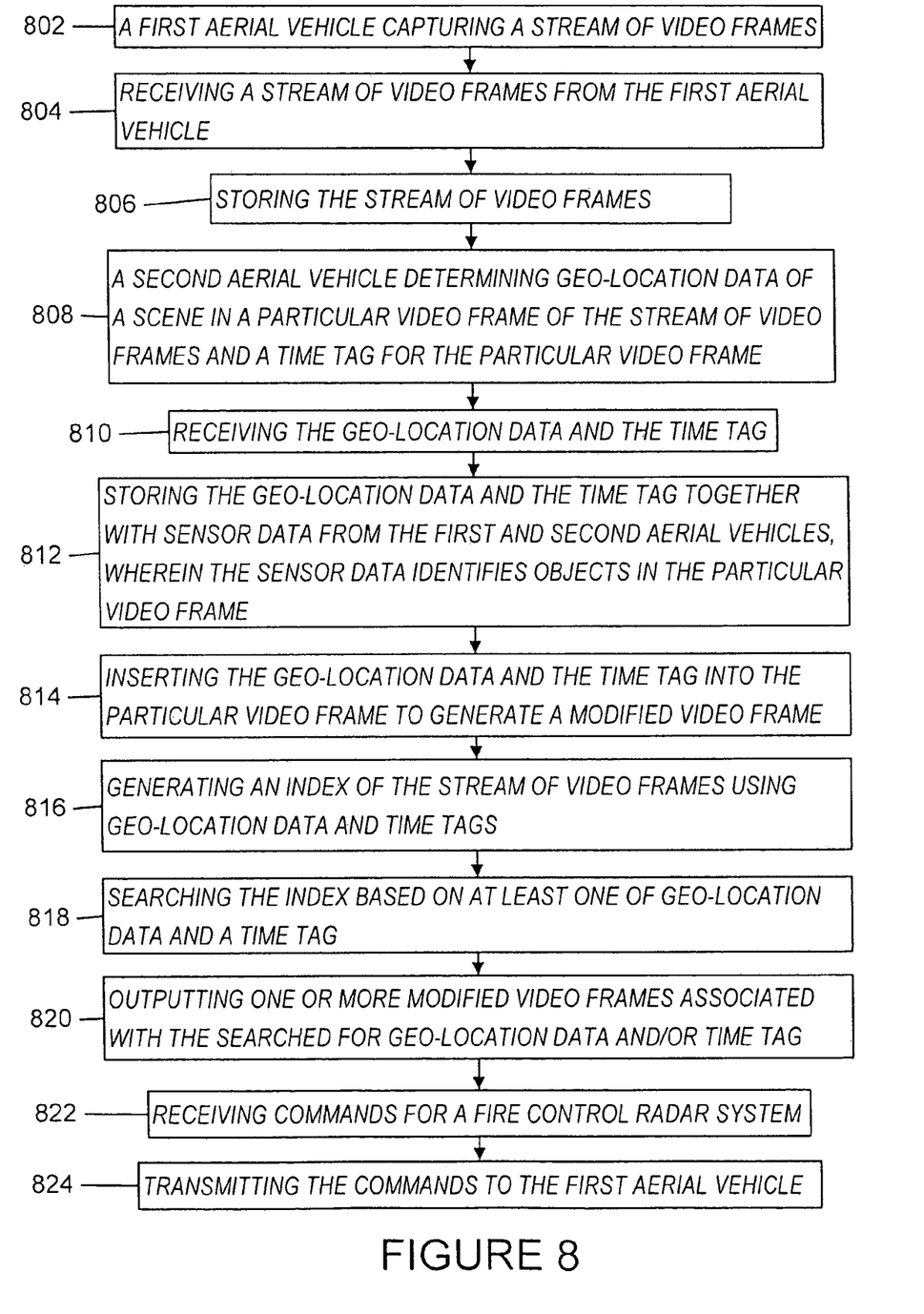
FIG. 8 is a flow diagram in accordance with an exemplary method.

FIG. 8 shows another exemplary method. In a first block 802, a first aerial vehicle captures a stream of video frames. In a next block 804, a stream of video frames is received from the first aerial vehicle. From block 804, control proceeds to block 806 where the stream of video frames is stored. From block 806, control proceeds to block 808 where a second aerial vehicle determines geo-location data of a scene in a particular video frame of the stream of video frames and a time tag for the particular video frame. The geo-location data can be determined, for example, by determining a distance between a scene in a particular video frame and the second aerial vehicle, and by determining an azimuth, elevation, orientation and position of the second aerial vehicle, wherein Global Positioning Satellite (GPS) signals are employed along with the distance, azimuth, elevation, orientation and position to determine the geo-location data. The geo-location data can also be determined, for example, by using an aircraft's true inertial space position as a reference and the gimbals/sensor azimuth and elevation angles combined with range to a target or object of interest in the video frame. The geo-location data can also be determined, for example, by gimbal scanning to form video frames from different aircraft positions and aspect angles.

From block 808, control proceeds to block 810 where the geo-location data and the time tag are received. From block 810, control proceeds to block 812, in which the geo-location data and the time tag are stored together with sensor data from the first and second aerial vehicles, wherein the sensor data identifies objects in the particular video frame. The identified objects can be, for example, vehicles or buildings, or other targets or objects of interest. From block 812, control proceeds to block 814, in which the geo-location data and the time tag are inserted into the particular video frame to generate a modified video frame. The insertion can for example be performed by the TCDL electronics 220, 605, 533. The geo-location data can, for example, be inserted into a visible portion of the video frame, or can be inserted into a non-visible portion of the video frame.

From block 814, control proceeds to block 816, where an index of the stream of video frames is generated using geo-location data and time tags. From block 816, control proceeds to block 818, where the index is searched based on at least one of geo-location data and a time tag. From block 818, control proceeds to block 820, where one or more modified video frames which are associated with the searched for geo-location data and/or time tag, are outputted. For example, the modified video frame can be outputted onto a computer-generated terrain map of a region of interest such that the modified video frame and any targets or objects of interest are located within a proper geo-location within the displayed terrain map. From block 820, control proceeds to block 822, where commands for a fire control radar system are received. From block 822, control proceeds to block 824, where commands are transmitted to the first aerial vehicle.

Figure 1:
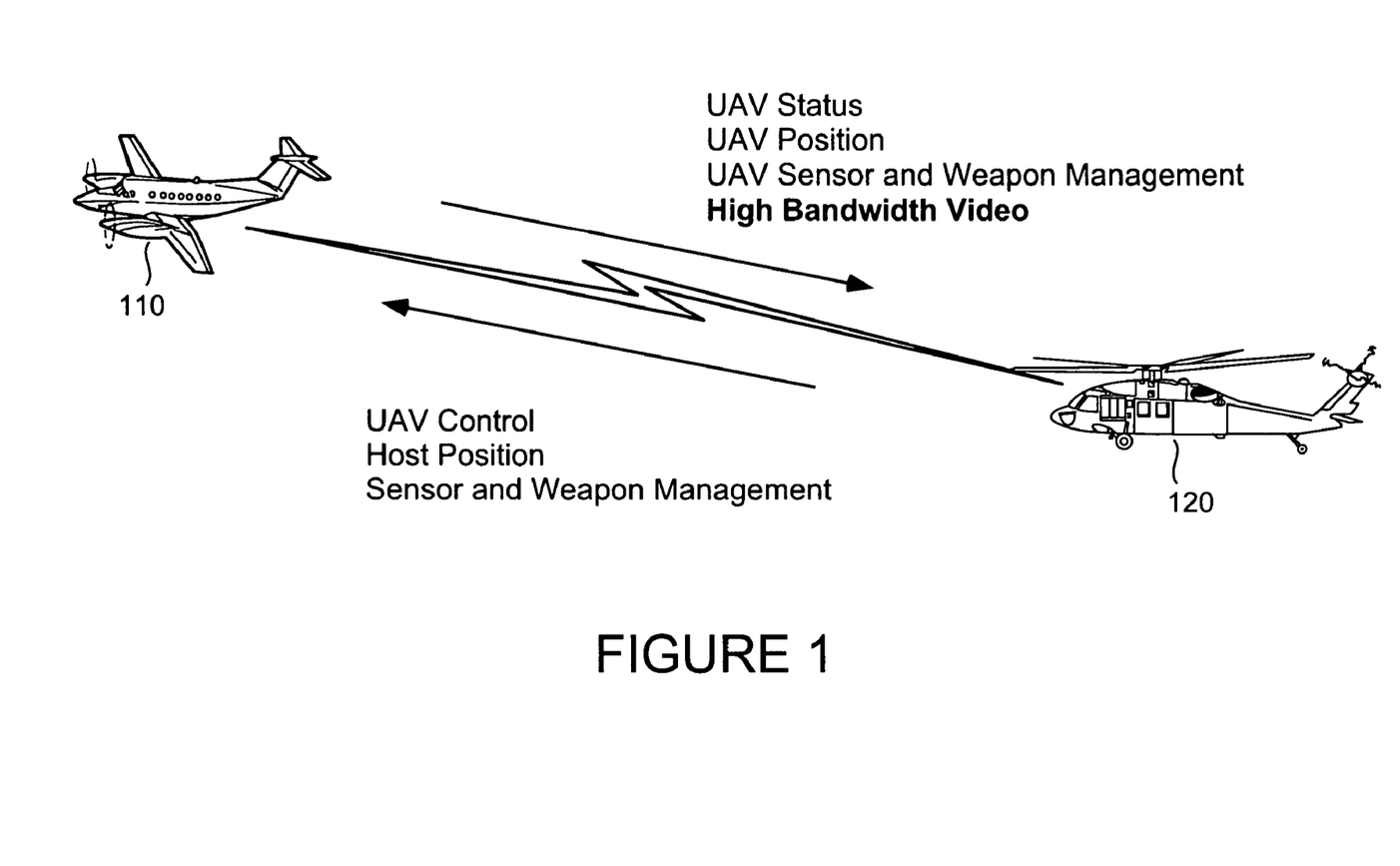
FIG. 1 illustrates an exemplary arrangement including an unmanned aircraft and a rotary-winged aircraft.

The methods illustrated in FIGS. 7-8 can be implemented using the apparatus illustrated in FIGS. 1-6. As illustrated in FIG. 1, a first aerial vehicle such as an unmanned aerial vehicle (UAV) 110 can transmit its status information, position information, sensor and weapon management information, and high bandwidth video to a second aerial vehicle 120, e.g., a helicopter. The second aerial vehicle 120 can transmit control information to control the UAV 110, the second aerial vehicle's position, and sensor and weapons management information to the UAV 110.

Figure 2:
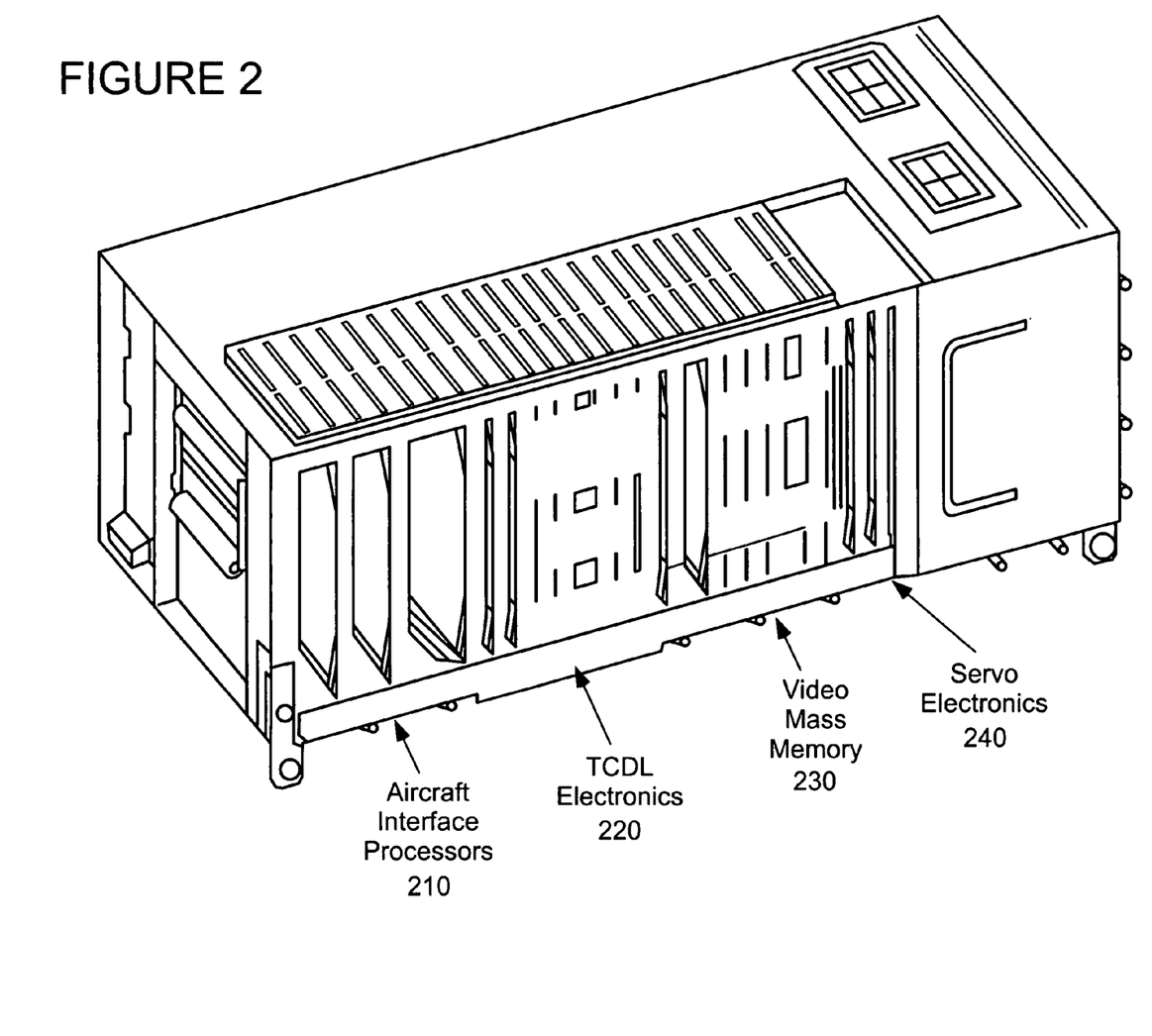
FIG. 2 illustrates an electronics box that can be used in the arrangement of FIG. 1.

FIG. 2 illustrates an electronics box which can be installed in the second aerial vehicle 120. The electronics box includes aircraft interface processors 210, Tactical Common Data Link (TCDL) electronics 220, video mass memory 230, and servo electronics 240. The TCDL electronics 220 interfaces with the Fire Control Radar (FCR) system of the aerial vehicle 120 such that the FCR commands are intercepted by the electronics box and transmitted to the UAV 110 for control of the UAV 110. The TCDL electronics 220 also allows the output of the video stored in video mass memory 230 onto a screen which is conventionally employed for the FCR system. Servo electronics 240 controls the antenna of the TVOD™ (Tactical Video On Demand) system.

Figure 3:
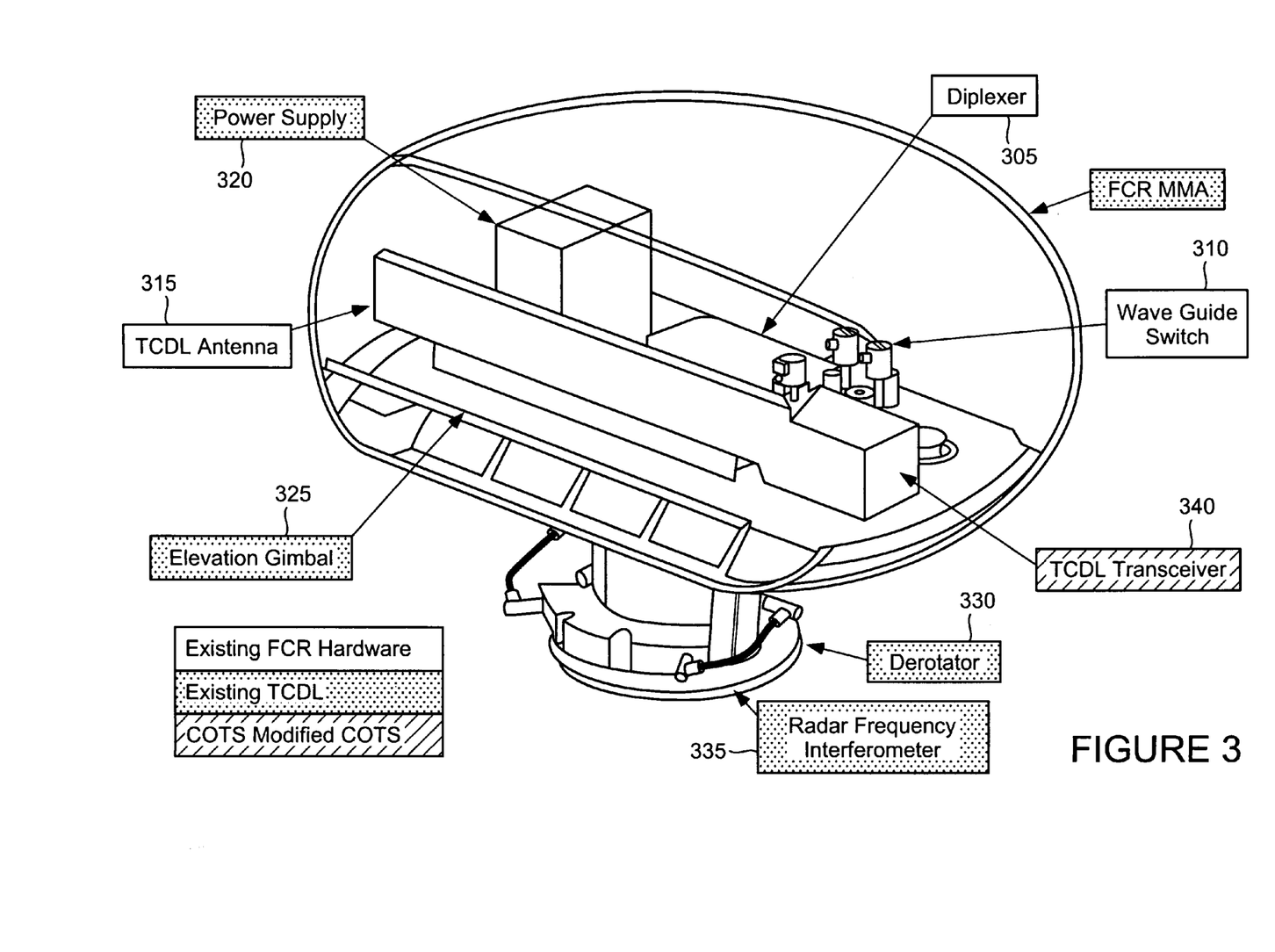
FIG. 3 illustrates a mast-mounted assembly (MMA) suitable for use on the rotary-wing aircraft of the exemplary arrangement shown in FIG. 1.

FIG. 3 illustrates a mast mounted assembly (MMA) in accordance with exemplary embodiments. Specifically, the MMA (Mast Mounted Assembly) can be built using a conventional FCR MMA. Accordingly, diplexer 305, wave guide switch 310 and TCDL antenna 315 are the elements which replace the radar in an FCR MMA and convert it to a TVOD™ subsystem. The antenna 315 can be a linear taper antenna. In an exemplary embodiment, the size of the antenna 315, for example the length or width of the antenna 315, is greater than the rotary blade width or chord. This can increase the antenna's ability to receive and transmit through rotor blade arc or rotor disc of the rotary wing platform on which the antenna 315 is mounted. The diplexer 305 allows simultaneous transmission and reception of closely spaced radio or radar frequency (RF) signals, the switch 310 provides a method of switching transmission and reception bands, and TCDL antenna 315 focuses RF energy into a narrow beam for transmission and reception. In other exemplary embodiments, instead of replacing components within the MMA such as the radar in an FCR MMA, components necessary for implementing embodiments of the present invention can be placed into an existing MMA without removing existing components from the MMA. Those skilled in the art will recognize that MMA's of any compatible design or configuration can be used, and can be designed and constructed for specific applications of the present invention.

As shown in FIG. 3, the TVOD™ subsystem can also include an MMA power supply controller 320, an elevation gimbal 325, a derotator 330, and a radar frequency interferometer 335, all of which are in common with the FCR MMA. The MMA power supply controller can provide all necessary power and control signals to drive all of the MMA hardware. The elevation gimbal 325 holds the antenna and elevation motor, and facilitates pointing in the elevation axis. The derotator 330 is a component of the helicopter rotor system, and the MMA mates to the derotator 330. Radar frequency interferometer 335 provides bearing data and classification information for the radar emitters.

In accordance with an exemplary embodiment of the present invention, the FCR MMA is modified to include a TCDL transceiver 340 (which can be a conventional or commercial off-the-shelf (COTS) component) for communication with the UAV. Specifically, the TCDL transceiver 340 amplifies the modulated waveforms for transmission and reception.

Figure 9:
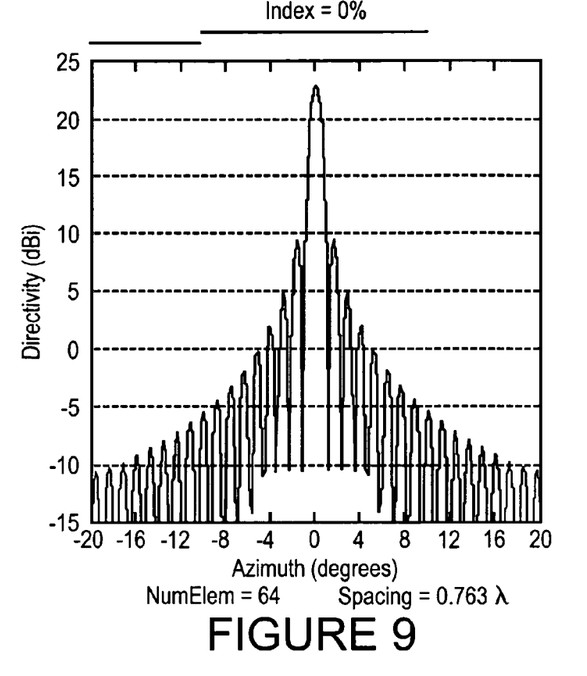
FIGS. 9-10 illustrate exemplary attenuation of an antenna mounted in the mast-mounted assembly of FIG. 3 by the main rotor blades of a rotary-winged aircraft on which the mast-mounted assembly is mounted.
Figure 10:
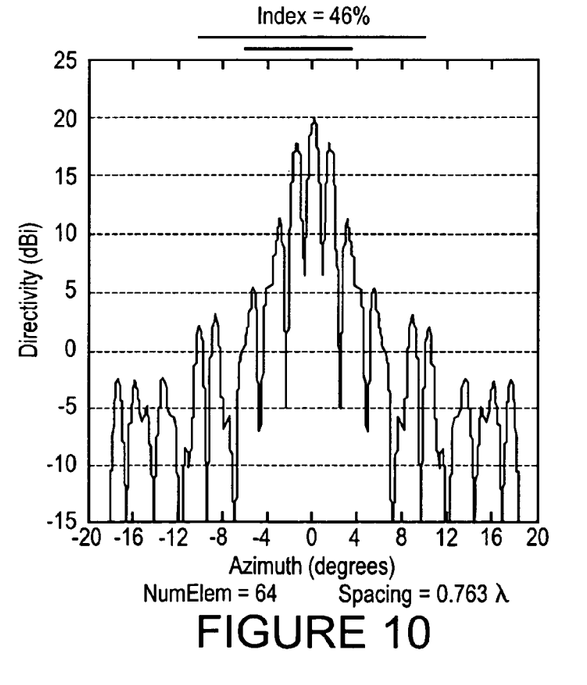

FIGS. 9-10 illustrate exemplary attenuation of an antenna mounted in the mast-mounted assembly of FIG. 3 by the main rotor blades of a rotary-winged aircraft on which the mast-mounted assembly is mounted. In particular, FIG. 9 shows the effect of an AH-64 Apache helicopter's blade on the antenna beam with an index of 0%, and FIG. 10 shows the effect with an index of 46%.

Figure 4:
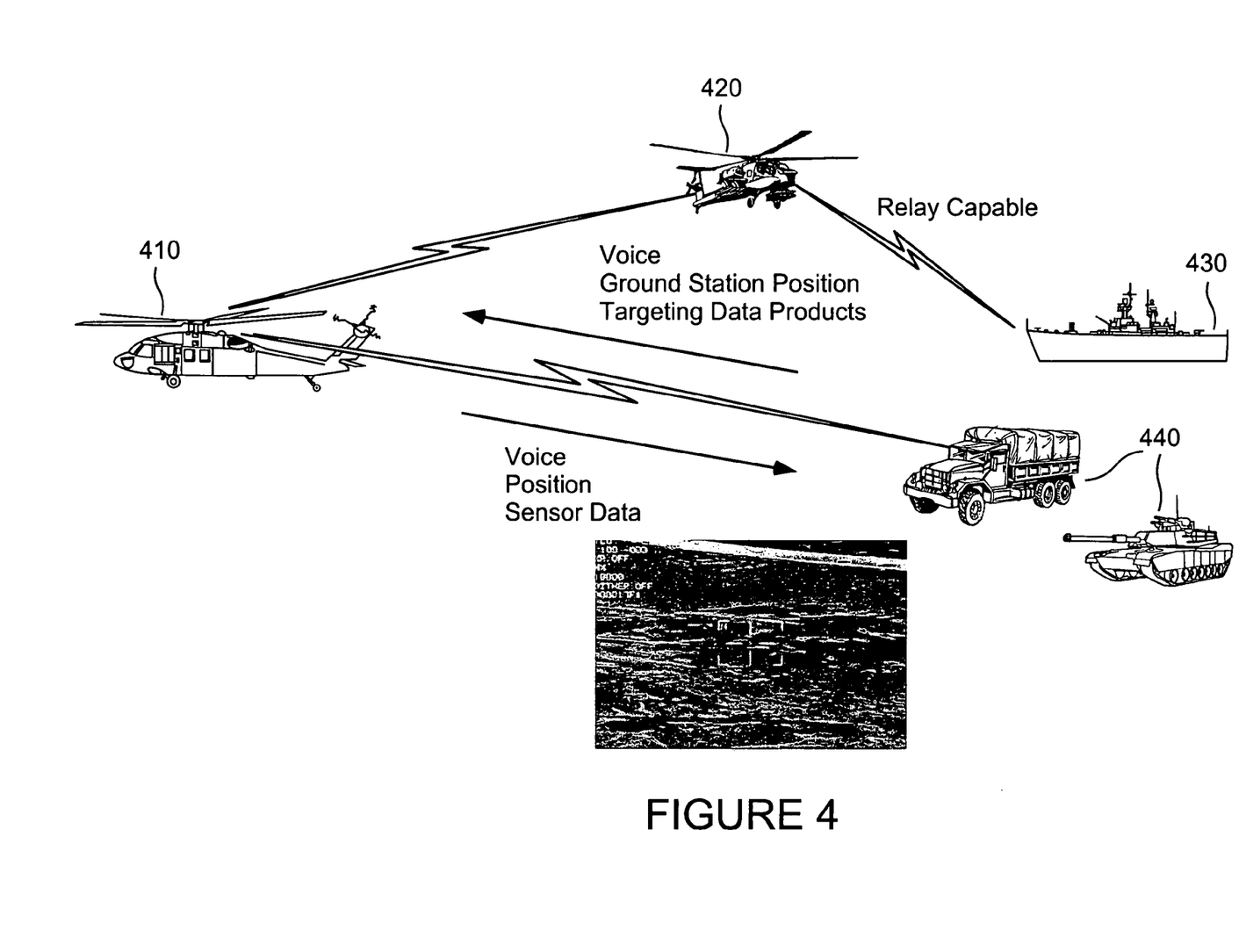
FIG. 4 illustrates an exemplary arrangement including additional entities in communication with the rotary-winged aircraft of FIG. 1.

FIG. 4 illustrates an exemplary arrangement for providing video on demand in accordance with exemplary embodiments of the present invention. As illustrated in FIG. 4, the aerial vehicle providing the video information, i.e., aerial vehicle 410, can be a manned aerial vehicle. By incorporating the electronics box of FIG. 2 and the MMA of FIG. 3 into a conventional aerial vehicle, the aerial vehicle 410 can provide video on demand to another manned aerial vehicle 420, a ship 430, or ground vehicles 440. Although not illustrated, the on demand video can also be provided to a ground station, e.g., a building. Additionally, to increase the distance over which video on demand can be provided, an aerial vehicle 420 with the electronics box of FIG. 2 and the MMA of FIG. 3 can act as a relay to provide video on demand to places which are not within the transmission range of the aerial vehicle 410, but are within the transmission range of the aerial vehicle 420.

Figure 5:
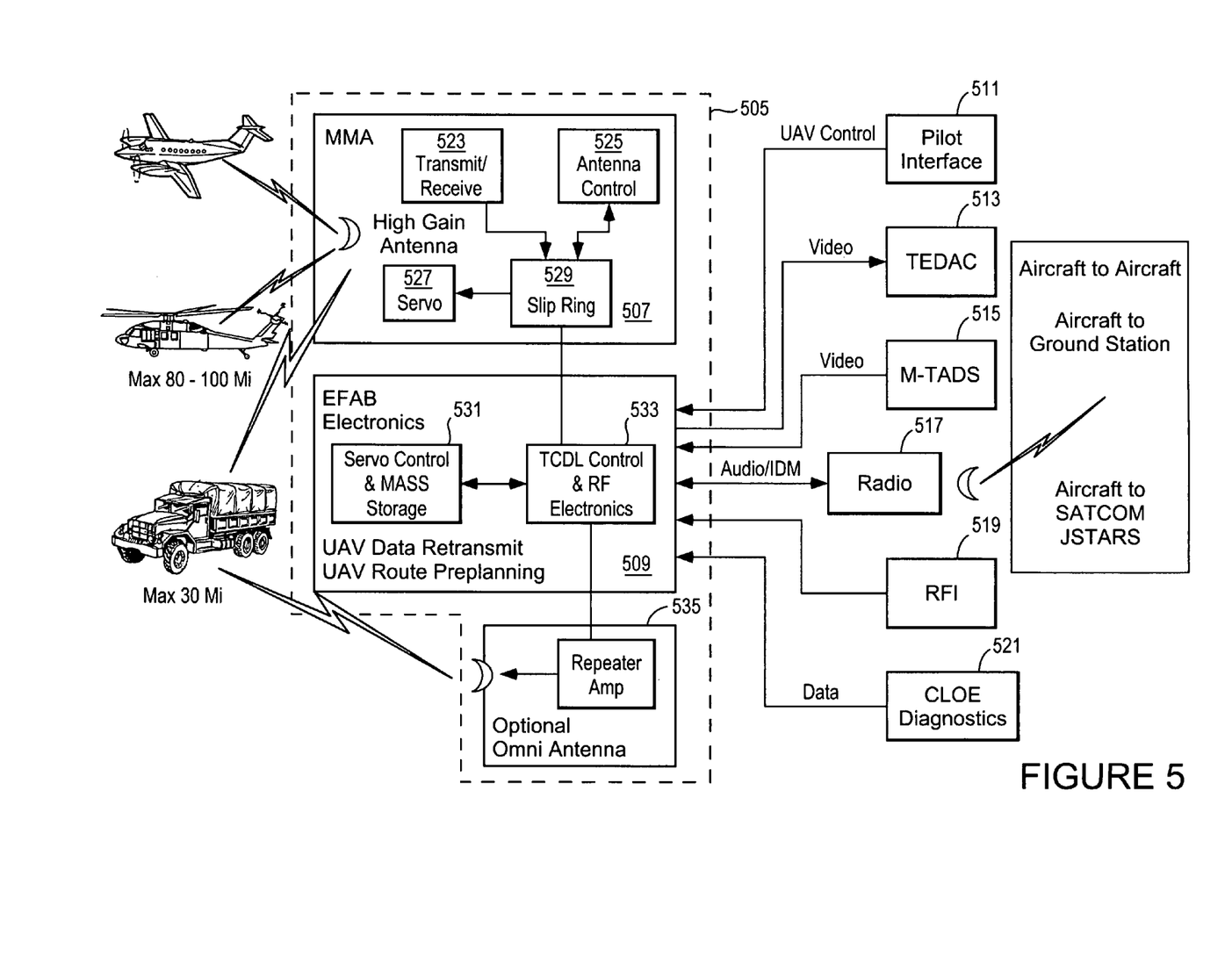
FIG. 5 is a block diagram of an exemplary system.

FIG. 5 is a functional block diagram of a system in accordance with exemplary embodiments of the present invention. In FIG. 5 the elements in dashed box 505 are located in and/or on a single aerial vehicle, for example the rotary wing platforms 120, 410 and 420. Accordingly, the aerial vehicle can include an MMA 507 (illustrated in FIG. 3), Extended Forward Avionics Bay (EFAB) 509 (the electronics box is illustrated in FIG. 2), a pilot interface 511, a TADS Electronic Display And Control (TEDAC) 513, an M-TADS 515, a radio 517, a Radar Frequency Interference (RFI) Measurement unit 519 and a Common Logistical Environment (CLOE) diagnostics module 521. The pilot interface 511 is a man-machine interface on a second aerial vehicle, for example the rotary wing platform. The TEDAC 513 is a display interface for the man-machine interface on a rotary wing platform. M-TADS 515 is a Modernized Targeting and Designation System which includes electro-optic sensors. Radio 517 provides audio and limited data communications between platforms, for example aircraft to aircraft, aircraft to ground station, and aircraft to SATCOM (Satellite Communications) and/or aircraft to JSTARS (Joint Surveillance Target Attack Radar System). RFI Measurement unit 519 provides bearing data and classification information for radar emitters. CLOE diagnostics module 521 functions as a health monitor for the aircraft.

The MMA includes a transceiver 523, an antenna control module 525, a servo 527 and a slip ring 529. The transceiver 523 amplifies the modulated waveforms for transmission and reception. Antenna control module 525 performs all signals necessary to keep the antenna pointed correctly. Servo 527 provides a mechanism to allow antenna stabilization. Slip ring 529 allows electrical and RF signals to maintain continuity through a continuously rotating mechanical interface. The EFAB electronics module 509 includes a servo control and mass storage unit 531 and a TCDL control and Radar Frequency electronics 533. Servo control and mass storage unit 531 performs all calculations necessary to keep the antenna correctly pointed, provides an interface to and method of storing and retrieving MTADS (Modernized Targeting and Designation System) and UAV sensor data. TCDL control and RF electronics 533 performs video compression/decompression, data multiplexing/demultiplexing, compression/de-compression, and modulation/demodulation. In addition, optional omni antenna 535 can be installed in the aerial vehicle to allow the aerial vehicle to act as a repeater of video and other information from other similarly equipped aerial vehicles. For example, the antenna 535 allows TCDL to operate in a repeater mode to a ground station. However, the omni antenna 535 is used only for repeating functions, and can be omitted if an aerial vehicle will not be used as a repeater, although such an aerial vehicle can still have its video and other information repeated by another aerial vehicle with the omni antenna.

Figure 6:
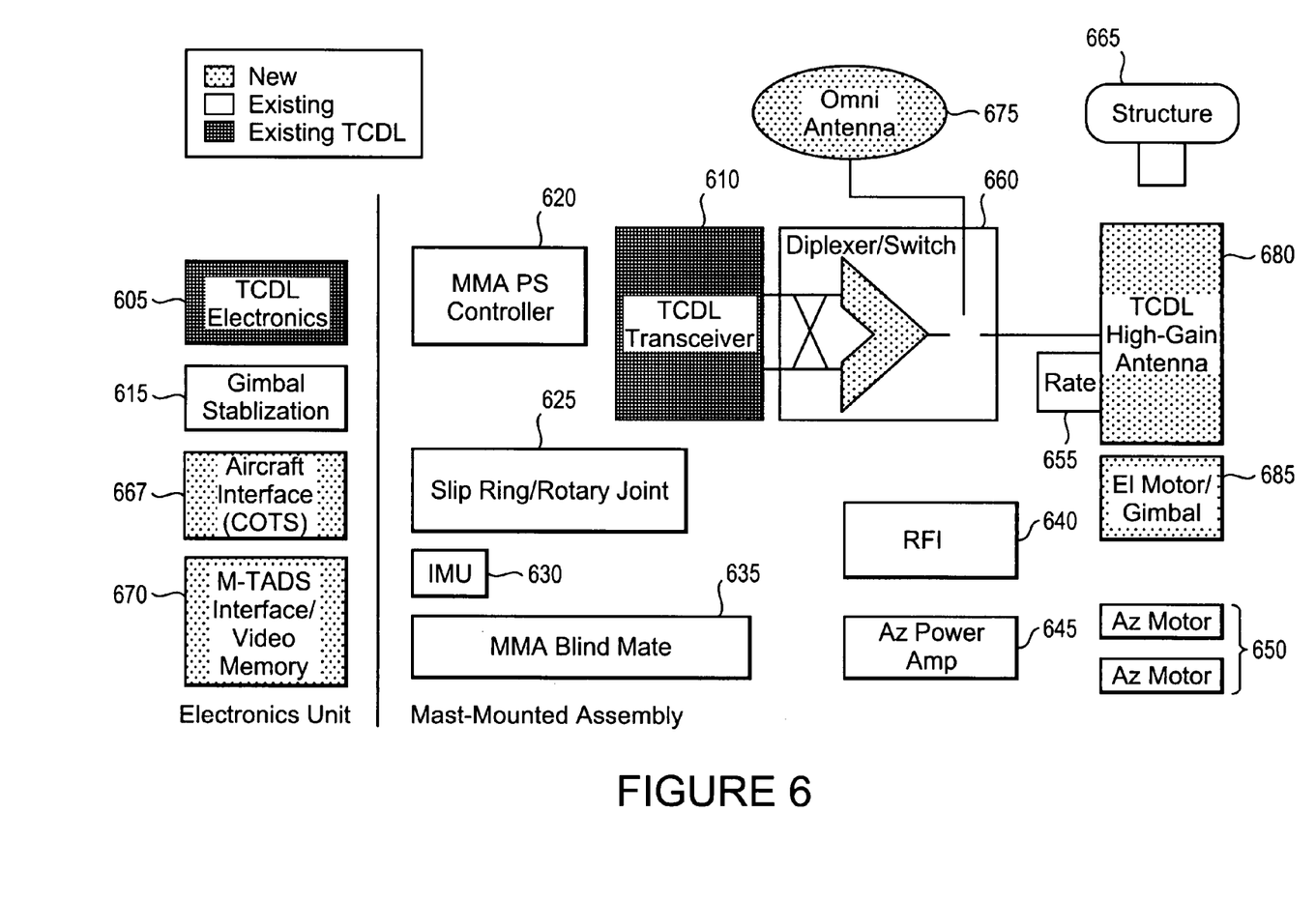
FIG. 6 is a block diagram of an exemplary system of the rotary-winged aircraft of FIG. 1.

FIG. 6 is a block diagram of an exemplary TVOD™ system for installation in a helicopter, such as an Apache helicopter. Conventional components of a TCDL system include the electronic module 605 and the TCDL transceiver 610. The TCDL electronics 605 performs video compression/decompression, data multiplexing/demultiplexing, compression/de-compression and modulation/demodulation.

Conventional elements of an aerial vehicle shown in FIG. 6 include the gimbal stabilization module 615, the MMA PS controller 620, the slip ring/rotary 625, the IMU (Inertial Measurement Unit) 630, the MMA blind mate 635, the RFI module 640, the azimuth power amplifier 645, the azimuth motors 650, the rate module 655, the diplexer/switch 660 and the structure 665. The gimbal stabilization module 615 can perform all calculations necessary to keep the antenna pointed correctly. The slip ring/rotary joint 625 allows electrical and RF signals to maintain continuity through a continuously rotating mechanical interface. The IMU 630 is an inertial measurement unit which provides acceleration and direction data necessary for antenna stabilization and control. The MMA blind mate 635 is a self aligning electrical connector that brings all input and output signals to the mast mounted assembly. The RFI module 640 provides bearing data and classification information for radar emitters. The azimuth power amplifier 645 provides signal amplification necessary to stabilize the antenna. The azimuth motors 650 drive the mast mounted antenna in the azimuth axis. The rate module 655 is a rate sensor which provides data necessary to stabilize the antenna. The diplexer/switch 660 allows simultaneous transmission and reception of closely spaced RF signals and provides a method of switching transmission and reception bands. The structure 665 is a composite/aluminum mechanism capable of housing the listed components in a rotary wing environment.

Modifications to existing hardware to implement the video on demand system include the aircraft interface module 667, the M-TADS interface/video memory module 670, the omni-directional antenna 675, the TCDL high-gain antenna 680, and the elevation motor/gimbal 685. The aircraft interface module 667 provides all input and output functions necessary to communicate with the host aircraft. The M-TADS interface/video memory module 670 provides an interface to and method of storing and retrieving MTADS and UAV sensor data. The omni-directional antenna 675 provides a 360 degree coverage at limited ranges. The high gain antenna 680 focuses RF energy into a narrow beam for transmission and reception. The El (elevation) motor/gimbal 685 drives the antenna in the elevation axis.

In accordance with exemplary embodiments of the present invention, a mass video storage memory (e.g., in block 531) stores a stream of video frames and data associated with each of the video frames. The associated data can include geo-location data, a time tag, and sensor data from sensors on the vehicle carrying the mass video storage memory and/or from sensors on the vehicle which capture the stream of video frames. The associated data are indexed against the stored video frames to allow searching of the video frames using the associated data as search parameters, in accordance with conventional indexing and searching techniques. Accordingly, a ground unit, another aerial vehicle, or a water-borne unit which has access to the mass video storage memory (for example via a high-bandwidth data link, e.g. an electronic, radio or optical data link) can select and retrieve particular video frames or one or more extended streams or sets of full-motion video frames for particular geo-locations, and/or page through past and present target images. Additionally, when video frames are retrieved from the mass video storage memory and transmitted to a requester of the video frames, the associated data can be inserted into the video frame, thereby allowing the requestor to see both the video and the associated data simultaneously.

Exemplary embodiments of the present invention provide systems and methods which can use standardized Tactical Common Data Link (TCDL) hardware and waveform(s) in combination with multiple other electronic and software techniques and functions to transmit, store, distribute and manipulate sensor data. Of course, other communication protocols and hardware can be used to implement various embodiments of the invention, that are capable of providing the various functions and capabilities described herein. This sensor data includes streaming high resolution digital video with geo-location and other feature data superimposed on it. This provides a unique set of capabilities useful for airborne reconnaissance, surveillance, and network-centric weapon fire control. An exemplary method includes receiving a stream of video frames, inserting geo-location data into a video frame to generate a modified video frame, and outputting the modified video frame.

In accordance with exemplary embodiments the geo-location data from the helicopter platform's electro-optical sighting system can be generated in the following manner as part of the TVOD™ architecture: aircraft true inertial space position can be used as a reference, and gimbals/sensor azimuth and elevation angles combined with range to a target of interest can form the basis of a computation to determine with high accuracy the position in inertial space of the remote target of interest. These computations can be performed repeatedly upon operator selection to add geo-location data to as many video frames as desired. Gimbal scanning to form images from different aircraft position and aspect angles can form an alternate method of computing geo-location data in the TVOD™ system. The sighting system can for example include or be implemented via a Modernized Targeting And Designation System (M-TADS) or other electro-optical image sensing systems.

The composite video (e.g., a stream of video frames including video frames modified to include geo-location data) can be selectively superimposed on a computer generated terrain map of the region of interest in such a way that the image and its targets of interest are portrayed on the correct geo-location within the displayed terrain map.

Exemplary embodiments and methods described herein confer numerous advantages. For example, communications capabilities of a rotary wing platform are increased to accommodate high bandwidth communications with ground and airborne transceivers, including for example air-to-air and/or air-to-ground video streaming, so that the rotary wing platform can operate effectively as a date source in a network-centric battlefield. The information transmitted to and/or from the rotary wing platform can include imagery together with geo-location data and time-tags, can be transmitted in a continuous stream or in discrete elements or blocks, and can be transmitted in real-time or with a time delay. The imagery can include one or more of video/television images, infra-red images, radar images, or any other kind of image generated based on sensor data received from a UAV or captured directly by the rotary wing platform. The imagery can also include synthetic or synthesized images, that are generated by a processor on board the rotary wing platform based on data from one kind of sensor or on data from different kinds of sensors received from one or more of a UAV in communication with the rotary wing platform, sensors on board the rotary wing platform, and/or other air or ground based sources such as the sources 420, 430, 440 shown in FIG. 4 or a ground station such as a building. The processor can for example be located within the TCDL electronics 220, 533, 605.

An exemplary method includes using a two-way data link to allow remote video and data search of time and geo-location tagged imagery emanating from either remote UAV or on-board aircraft sensors, using a standard graphic user interface that can be located at either a ground terminal or other airborne terminal. Nodes of the data link can for example be located for example on the aircraft 110, 120, 410, 420 and on communication stations 430, 440. The method can begin with storing compressed video data along with annotation data that includes location, angles, and internal settings (field of view, mode, gain, level, etc) of the sensor. This data can also include information from a signal processor associated with a sensor, for example a signal processor that processes signals (for example, including raw signals) output by the sensor, can include information from the host platform, and can include information from other sensors such as target detection track files, aircraft payload status, and specific mission details. The signal processor can be located at the sensor or remotely from the sensor. The two-way data link can be used to convey search commands from a user to the processor running the TVOD software. The TVOD software can for example be implemented via one or more of the electronics 220, the processors 210, the electronics 533, and/or on one or more processors or computers located in one or more nodes of the data link. Software running on processors or computers located in one or more nodes of the data link, for example TVOD software running on board the aircraft 120, 410, can function as a search engine to interpret the search commands and perform a search in accordance with the search commands on the data set that accompanies the compressed video. Where the search criteria are satisfied the software will send cueing information to the user over the two-way data link. Thus the TVOD software can include search engine capability and functionality. With the cueing information the user will be able to instruct the TVOD software to start sending compressed video and data, for example the data located or identified by the search, over the two-way data link for display.

An exemplary method includes incorporating storage media or data storage in the data link to record all sensor video and data along with associated geo-location and time-tag digital data. Storage media and a search engine can be located in one or more of a UAV, aircraft or ground station data link, for example nodes of the data link including one or more of the aircraft 110, 120, 410, 420 and on communication stations 430, 440. This arrangement or procedure takes advantage of the fact that in order for a UAV control and Video transmission data link (which can be part of the data link having nodes on the aircraft 110, 120, 410, 420) to perform its mission, digitally compressed video and associated data products must be available at the link. Placing the data storage or storage media in the link or at a node of the link makes the stored data easily accessible to the link, and also allows a remote data user, for example a user located at the aircraft 420 or the communication stations 430, 440 and/or accessing the data link via a node at one of those locations, to access to the stored products without interacting or interfering with other critical aircraft processes, for example aircraft processes such as flight control, weapons control, and sensor control of the aircraft 410, 120, and/or 110. Specifically, locating the data storage media in the data link (for example, on board the aircraft 120, 410) allows video-on-demand functions to occur with no detrimental effect on the aircraft's Operational Flight Program. The data storage can for example include the video mass memory 230, the module 531, and/or can include one or more separate or distributed storage devices variously located on nodes of the data link, for example on the aircraft 110, 120, 410, 420 and/or on communication stations 430, 440.

An exemplary method of data retrieval can include use of a program, for example a program on board the data link and operating on one of the nodes of the data link or operating in a distributed fashion among multiple nodes of the data link, to create a Graphical User Interface (GUI) that is compatible with existing ground stations, or provide information that is compatible or useful to GUI's implemented at the ground stations. The GUIs can, for example be implemented on nodes of the data link at those ground stations, or can be implemented on a computer or communication system that is in communication with a node of the data link. The GUI can be formed for example by a display including controls and images. A user-manipulated or user-interactive input device, including for example one or more of a pointing device, mouse, keyboard, joystick, microphone, optical sensor or other device that receives input or commands from the user (e.g. in the form of one or more of sound, movement, pressure/force, light or other inputs from the user) can be provided at the user's location, for example at a UAV control ground station, to allow the user to actuate the controls and manipulate the images shown on the display. For example, the GUI image can be compressed and sent to another station or entity, for example a ground station, using the data link. The station can automatically decompresses the received GUI image and display it to the user. The user can manipulate the input device in response to the received GUI image to select the video and data products to review or download.

Incorporating the storage media into the data link at one or more links of the data link can facilitate non-real time relay of video and data products. For example, a single two-way data link can use time-phased techniques to perform the functions of dual two-way data links. This can allow relay functions to occur while saving weight and cost on the airframe.

In an exemplary embodiment, accuracy of geo-location of detected targets can be improved through frame-to-frame integration and sensor fusion, i.e. integrating or fusing the outputs of different sensor and/or kinds of sensors to improve the quality (specifically or collectively) of one or more of the image data, the geo-location data and the time tags associated with the image data. Multiple frames of video and other sensor target detection reports can be collected and stored, for example in the data storage elements 230, 531 and/or at data storage modules or systems described herein, and algorithms can be performed on this data, by computers or processors located at the same node of the data link as the data storage, or at different node(s). Specifically, detections from multiple frames, or targets detected in different frames, can be associated and then analyzed or processed using algorithms to determine or refine the target location(s), e.g. a centroid of a target image, as well as determine an uncertainty region associated with the target(s). As more data is collected for a given target the uncertainty region can be reduced in size, thereby making the detection location more accurate. As the TVOD system passes target detection reports to the user using the two-way data link the reports can be accompanied by the more accurate geo-location data created by such multiple-frame processing.

In an exemplary embodiment, a linear taper antenna is used as the TCDL antenna on a rotary-wing platform to allow microwave continuous wave (CW) operation during helicopter blade obscuration. This enables the use of microwave (X-band and above) frequency data link systems in a helicopter environment without loss of data when rotor blades partially obscure the antenna. A typical parabolic microwave antenna has a taper that concentrates most of the RF (radio frequency) energy in the center of the beam. Such a typical antenna would have to be much greater in size than the obscuring helicopter blade. An antenna designed with a linear taper distributes the RF energy evenly across the surface of the antenna. When used in a helicopter environment or on a helicopter, a linear taper antenna with an aperture that is twice the size of the helicopter's rotor blade chord can maintain a data link with only a 3 db loss in signal power. Thus the antenna 315 can be implemented using a linear taper antenna.

In accordance with an exemplary embodiment, compression modes for data flowing through the system, for example compression modes for sensor data flowing through the data link (e.g. between a rotary winged platform and a UAV and/or from an aircraft to a surface-based communication station) can be automatically selected to trade image latency for image quality based on a user's control inputs. The compression can take place, for example, prior to transmission from an aircraft, and/or prior to data storage. The control inputs can be, for example, commands from the user to a sensor package or payload, that affect orientation of the sensors with respect to the environment the sensors are sensing or exploring and/or with respect to a platform such as a UAV or a rotary winged platform on which the payload is mounted or carried. For example, the payload and/or the platform on which the payload is carried can receive commands that require rapid slewing of the payload with respect to an environment that the payload is sensing or measuring. This rapid slewing translates into dramatic image variances from video frame to video frame, and in this situation a low-latency compression technique can be selected. The data link can compress the video in Low Latency Mode after determining that the received commands will or are likely to cause rapid slewing, for example by commencing low-latency compression on a next video frame. The data link can also send messages or information to inform the user or the user's data link, for example control bits in the data stream, that a Low Latency CODEC should be used for video decompression of the compressed data being sent to the user. If little or no slewing is being commanded, or if the payload has been commanded to automatically track a target, then a high-quality image compression technique can be automatically selected. Upon selection of a high-quality image compression technique, the next frame of video the data link will begin compressing the video in High Quality Mode. The data link can inform the user's data link that the High Quality Mode CODEC should be used for video decompression, for example via control bits in the data stream. For commanded slew rates that are intermediate or neither high nor low, optimal video compression techniques can be automatically selected and used in a similar manner to that describe above. This method can harmonize or balance the use of high quality video compression techniques that enhance video interpretation with the use of low latency techniques that optimize the man machine interface between the controller and the payload. The compression and decompression can be performed by computers or processors located for example in nodes of the data link on board the aircraft and communication stations shown in FIGS. 1, 2 and 4, for example by the electronics 220, 530 and/or other processors or computers provided at the data link nodes.

In accordance with an exemplary embodiment, spatially adjacent video frames can be stitched together, frame-to-frame image enhancement can be performed, and data from multiple sources such as weapon firing data, passive RF data, and radar sensing data can be fused or integrated, to increase the quality and/or usefulness of the data. This can be accomplished by first storing multiple frames of video and data in the data links' on board storage media, for example the mass storage in the unit 531 or the video mass memory 230 and/or another data storage in the data link. The stored video frames and data can then be processed to determine, from the line of sight of the sensor, the spatial location of each pixel. Video frames are then stitched together and pixels occupying the same spatial location are merged. Image processing algorithms are then used to minimize distortion of or in the image. Stored target data and other on-aircraft and off-aircraft data are fused or integrated, and then used to create symbology overlays, for example symbols or icons having different shapes or colors, text labels, and so forth than can be overlaid onto images of the video frames to provide additional information to a user viewing the video frames and/or a machine analyzing content of the video frames. These processes can be performed at either end of the data link, for example at a location of the sensors such as a UAV or rotary wing platform, at an intermediate location such as a rotary wing platform in communication with the UAV and with other air, ground or aquatic stations, or at an end location, for example where the user who is controlling the data link or receiving information from it is located.

An exemplary method includes using the data link transceiver and a corresponding modulator/demodulator to perform a multi-mode radar function, for example a transceiver on board the aircraft 120, 410 and connected to the antenna 315. On a rotary wing platform this radar mode can operate though the rotor blades. The radar mode is accomplished by adding software capability to the data link to enable its waveform generator to produce radar waveforms. The data link's digital receiver is then reprogrammed to receive and process radar returns, allowing the detection and classification of moving targets, the detection of terrain and obstacles, and the creation of synthetic aperture radar images. The data link's RF section can be modified or configured to allow selection of full duplex data link mode where transmit and receive frequencies are intentionally different, and/or allow Radar mode where the transmit and receive frequencies are required to be the same.

Those skilled in the art will appreciate that the data link(s) described herein can include all transceivers, computers, microprocessors, electronic components, devices or subsystems, antennas, and software, etc. necessary or desirable to perform the functions of the data links described herein, and can be variously located and can work independently, in concert, in a distributed fashion, or in any combination thereof. In addition, various embodiments and methods of the invention can be practiced with any communication, data analysis, and data processing techniques (compression, decompression, encryption, decryption, stitching, etc.) consistent with the invention.

The present invention can be embodied in other specific forms without departing from the spirit or essential characteristics thereof, and the invention is not limited to the specific embodiments described herein. The presently disclosed embodiments are illustrative and not restrictive. The scope is indicated by the appended claims rather than the foregoing description, and all changes within the meaning and range and equivalents thereof are intended to be embraced therein.

What is claimed is:

1. A method for processing and outputting video frames comprising:

receiving a stream of video frames from a first platform;
receiving first geo-location data from a second platform;
inserting the geo-location data into at least one received video frame to generate a stream containing, modified video frames;
superimposing at least one of the modified video frames onto a terrain map of a region of interest wherein objects within the at least one modified video frame are portrayed on a corresponding geo-location in the terrain map; and
outputting at least one frame in the stream of superimposed modified video frames based on the inserted geo-location data.

2. The method of claim 1, wherein the geo-location data inserted into a particular video frame is based on the geo-location data of a scene in the particular video frame.

3. The method of claim 1, wherein a time tag is also inserted into the video frame.

4. The method of claim 1, wherein the stream of video frames are received from an unmanned aerial vehicle.

5. The method of claim 1, comprising: receiving commands for a fire control radar system; and transmitting the commands to an unmanned aerial vehicle.

6. The method of claim 1, comprising: storing the stream of modified video frames.

7. The method of claim 6, comprising:

searching the stored geo-location data to identify geo-location data satisfying criteria specified in at least one search command; and
transmitting the identified geo-location data and video frames corresponding to the identified geo-location data.

8. The method of claim 6, wherein the time tags associated with the video frames are stored along with the geo-location data.

9. The method of claim 8, wherein the stream of video frames are captured by the first platform, the first platform comprising a first aerial vehicle,
the geo-location data and the time tags are determined by the second platform, the second platform comprising a second aerial vehicle,
and sensor data from the first and second aerial vehicles are stored along with the geo-location data and time tags.

10. The method of claim 9, wherein the sensor data identifies objects in a particular video frame.

11. The method of claim 10, wherein the identified objects are vehicles or buildings.

12. The method of claim 8, comprising: generating an index using the geo-location data and the time tags; and searching the index based on the geo-location data or the time tags, wherein the outputted modified video frames are those video frames which are associated with the searched for geo-location data or the time tags.

13. The method of claim 1, wherein the stream of video frames are captured by the first platform, the first platform comprising a first aerial vehicle, and
the geo-location data is determined by the second platform, the second platform comprising a second aerial vehicle.

14. The method of claim 13, wherein the determination of the geo-location data comprises:
determining a distance between a scene in a particular video frame and the second aerial vehicle; and
determining an azimuth, elevation, orientation and position of the second aerial vehicle, wherein Global Positioning Satellite (GPS) signals are employed along with the distance, azimuth, elevation, orientation and position to determine the geo-location data.

15. The method of claim 1, wherein the geo-location data is inserted into a visible portion of the video frame.

16. The method of claim 1, wherein the geo-location data is inserted into a non-visible portion of the video frame.

17. The method of claim 1, wherein the geo-location data is determined by using an aircraft's true inertial space position as a reference and the gimbals/sensor azimuth and elevation angles combined with range to a target of interest in the video frame.

18. The method of claim 1, wherein the geo-location data is determined by gimbal scanning to form video frames from different aircraft positions and aspect angles.

19. The method of claim 1, wherein the modified video frame is output onto a computer generated terrain map of a region of interest such that the modified video frame and any targets of interest are located within a proper geo-location within the displayed terrain map.

20. A system comprising:
a receiver which receives a stream of video frames from a first platform and receives geo-location data from a second platform;
a first processor which inserts the geo-location data into a plural frames of the stream of video frames to generate a stream of modified video frames;
a second processor that superimposes at least one of the modified video frames onto a terrain map of a region of interest, wherein objects within the at least one modified video frame are portrayed on a corresponding geo-location in the terrain map; and
an output that transmits the at least one superimposed modified video frame based on the inserted geo-location data.

21. The system of claim 20, wherein the receiver comprises a linear taper antenna.

22. The system of claim 20, wherein the receiver comprises an antenna arranged to receive and transmit radar signals.

23. The system of claim 20, comprising: a transmitter connected to the output for transmitting the modified video frame.

24. The system of claim 20, comprising: a memory for storing the video frames along with associated geo-location data.

25. The system of claim 24, wherein the processor indexes the geo-location data, searches the geo-location data based on a search input, and the output modified video frame is a video frame corresponding to the search input.

26. The system of claim 24, wherein the memory also stores time tags and sensor data associated with each of the video frames, and wherein the processor indexes the geo-location data, searches the geo-location data, the time tags and/or the sensor data based on a search input, and the output modified video frame is a video frame corresponding to the search input.

27. The method of claim 1, comprising determining the geo-location data using at least positioning information of the second platform and a distance between a scene in a particular video frame and the second platform.

28. A video on demand system of an aircraft comprising:
a transceiver that receives a stream of video frames from a first platform and frame data from a second platform, wherein the transceiver modifies at least one frame in the stream of video frames with the frame data, includes a linear taper antenna having an aperture greater than a rotary blade chord of the aircraft.

29. The system of claim 28, wherein the frame data includes location data, a time stamp, angles, and internal settings of the first platform.

30. The system of claim 28, comprising:
a first processor that inserts the frame data into video frames to generate a stream of modified video frames;
a storage device that stores and indexes plural streams of modified video frames based on the frame data;
an output that retrieves modified video frames from the storage device based on the frame data and transmits the retrieved video frames to a display; and
a second processor that superimposes each modified video frame onto a terrain map of a region of interest, wherein objects within each modified video frame are portrayed on a corresponding location in the terrain map.

31. The system of claim 28, wherein the output retrieves at least one modified video frame based on the frame data.

* * * * *